United States Patent [19]

Penneck et al.

[11] Patent Number: 4,458,104

[45] Date of Patent: Jul. 3, 1984

[54] DIMENSIONALLY RECOVERABLE ARTICLES

[75] Inventors: Richland J. Penneck, Lechlade; David P. Thomas, Inkpen; Allan J. Cox, Swendon, all of England

[73] Assignee: Raychem Limited, London, England

[21] Appl. No.: 390,456

[22] Filed: Jun. 21, 1982

[30] Foreign Application Priority Data

Jun. 22, 1981 [GB] United Kingdom ............... 8119243

[51] Int. Cl.³ .................... H02G 13/06; H01R 4/00; B29C 27/00; H01B 13/06
[52] U.S. Cl. ................................. 174/88 R; 174/92; 174/DIG. 8; 156/49; 156/56; 156/86; 428/99; 428/174; 428/179; 428/36
[58] Field of Search .............. 174/DIG. 8, 11, 88 R, 174/92, 87, 74 A; 428/99, 174, 179, 36; 156/49, 56, 86

[56] References Cited

U.S. PATENT DOCUMENTS

| | | | |
|---|---|---|---|
| 2,027,962 | 1/1936 | Currie ................................ | 156/212 |
| 3,036,242 | 4/1963 | Cook et al. ....................... | 264/209.1 |
| 3,379,218 | 4/1968 | Conde ......................... | 174/DIG. 8 |
| 3,455,336 | 7/1969 | Ellis ................................... | 138/99 |
| 3,542,077 | 11/1970 | Muchmore .......................... | 138/178 |
| 3,597,372 | 8/1971 | Cook .................................. | 525/101 |
| 3,770,556 | 11/1973 | Evans et al. ......................... | 428/77 |
| 3,770,876 | 11/1973 | Post ................................. | 174/88 R |
| 3,969,308 | 7/1976 | Penneck .............................. | 525/101 |
| 4,018,733 | 4/1977 | Lopez et al. ....................... | 156/327 |
| 4,035,534 | 7/1977 | Nyberg .............................. | 428/516 |
| 4,070,746 | 1/1978 | Evans et al. .......................... | 29/450 |
| 4,142,592 | 3/1979 | Brusselmans ................. | 174/DIG. 8 |
| 4,179,320 | 12/1979 | Midgley et al. ..................... | 428/212 |
| 4,181,775 | 1/1980 | Corke ................................. | 428/36 |
| 4,194,750 | 3/1980 | Sovish et al. ................. | 174/DIG. 8 |
| 4,298,415 | 11/1981 | Nolf ............................. | 174/DIG. 8 |
| 4,366,201 | 12/1982 | Changani et al. ..................... | 156/86 |
| 4,378,393 | 3/1983 | Smuckler ............................ | 428/99 |
| 4,410,379 | 10/1983 | Franck .............................. | 156/86 |

Primary Examiner—William R. Dixon, Jr.
Attorney, Agent, or Firm—T. Gene Dillahunty; Edith A. Rice; Herbert G. Burkard

[57]     ABSTRACT

A dimensionally recoverable body, which is preferably heat-recoverable, has a body wall which is provided with a plurality of locking elements that are engageable with each other, or are engageable with corresponding elements located on a separate partition, to furcate the body into a plurality of channels.

The body may be used for enclosing branch-offs in electrical cables in order to protect the enclosed branch-off from the environment.

36 Claims, 14 Drawing Figures

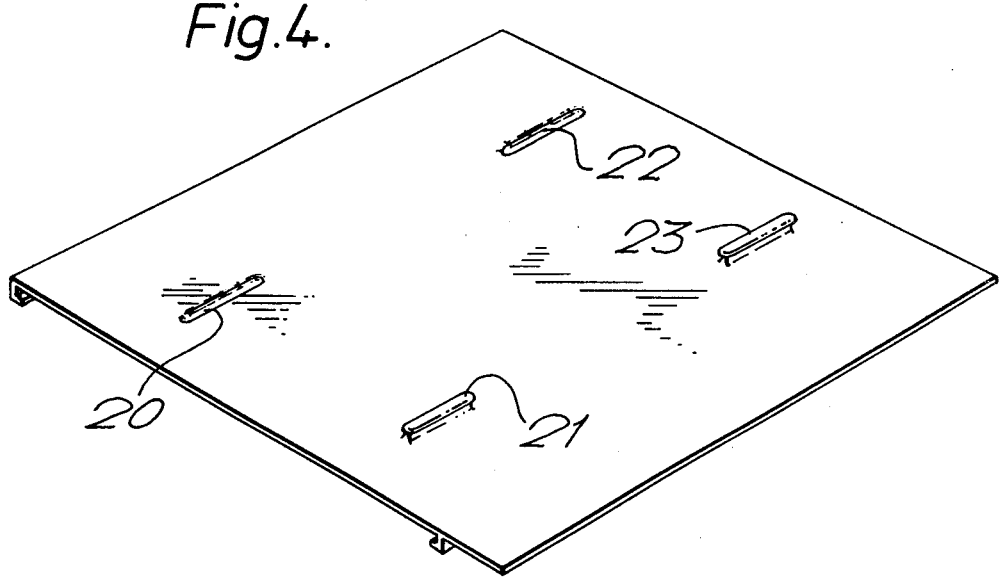
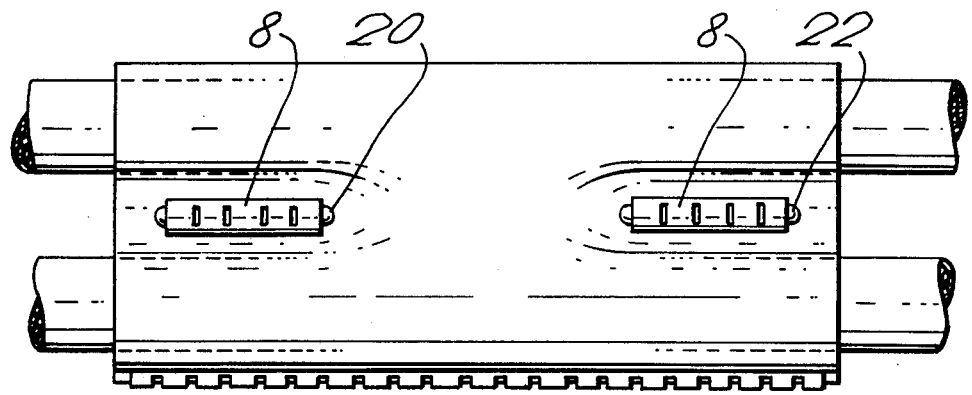

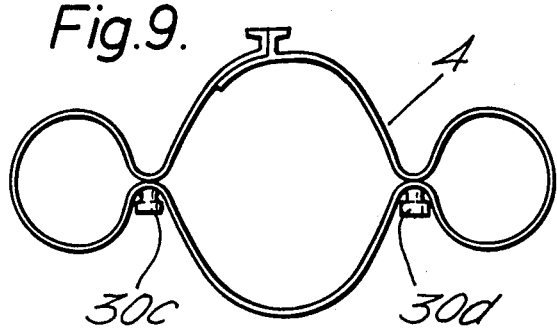
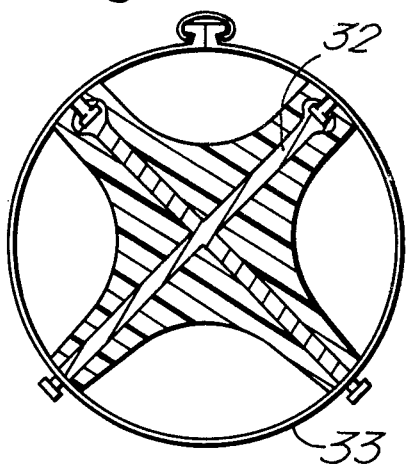
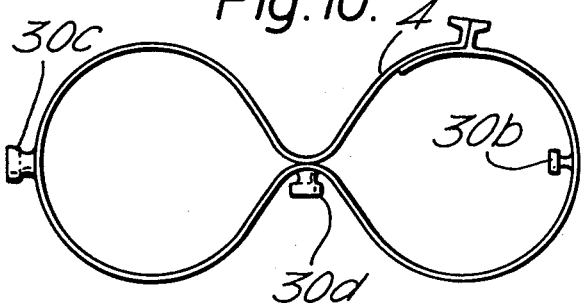
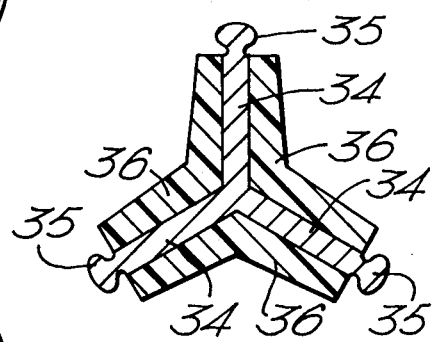
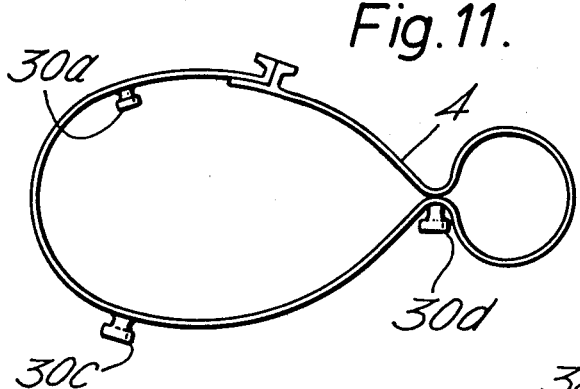
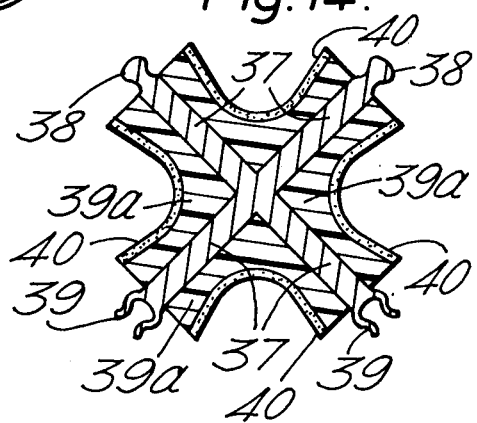

DIMENSIONALLY RECOVERABLE ARTICLES

This invention relates to articles for enclosing elongate objects such as electrical cables and other supply lines. The invention relates, in particular, to dimensionally-recoverable articles for enclosing such objects.

Dimensionally-recoverable articles are articles, the dimensional configuration of which can be made substantially to change when subjected to the appropriate treatment. Of particular note are dimensionally heat-recoverable articles, that is, articles, the dimensional configuration of which may be made substantially to change when subjected to heat treatment. Usually these articles recover, on heating, towards an original shape from which they have previously been deforemd, but the term "Heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, U.S. Pat. Nos. 2,027,962; 3,086,242 and 3,597,372. As is made clear in, for example, in U.S. Pat. No. 2,027,962, the original dimesionally heat-stable form may be a transient form in a continuous process in which, for example, an extruded tube is expanded, whilst hot, to a dimensionally heat-unstable form, but in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensionally recoverability. One manner of producing a heat-recoverable article comprises shaping the polymeric material into the desired heat-stable form, subsequently cross-linking the polymeric material, heating the article to a temperature above the crystalline melting point or, for amophous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524 (U.S. equivalent U.S. Pat. No. 4,035,534), an elastomeric member such as an outer tubular member is held in a stretched state by a second member, which, upon heating weakens and thus allows the elastomeric member to recover.

Other forms of dimensionally-recoverable articles are those in which an elastomeric material is bonded to a layer of material that holds the elastomeric material in an extended configuration so that the elastomeric material will contact when the bond is broken. Such articles which are known as "cold-shrink" articles are described in U.S. Pat. No. 4,070,746, and U.K. Patent Specification No. 2,018,527A, (U.S. equivalent U.S. Pat. No. 4,179,320) the disclosures of which are incorporated herein by reference.

Dimensionally-recoverable articles have been widely employed for enclosing electrical cables and the like, and especially for insulating and protecting splices in such cables, in which case dimensionally recoverable splice cases sold by Raychem under the trade names VASM and XAGA may be used. The articles may be of a generally tubular configuration if the ends of the cable are readily accessible, or, where the ends are not accessible, they may be in the form of so-called "wrap-around" sleeves. Wrap-around sleeves are essentially dimensionally-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218 and British Pat. Nos. 1,155,470; 1,211,988 and 1,346,479 (U.S. equivalents U.S. Pat. Nos. 3,455,336; 3,542,077; and 3,770,556, respectively). In other applications, however, the sheet may be held in the wrapped-up configuration during recovery by means of an adhesive which may, in some cases, be applied on site.

Heat-recoverable sleeves and wrap-around sleeves have been successfully employed in many fields of application. However, problems may arise when two or more substrates such as supply lines, for example cables or pipes, have to be sealed at one position. This problem, which is known as "branch-off", may occur, for example, at the outlet of a heat-recoverable part. Amongst areas in which this problem is typically encountered there may especially be mentioned the outlets of the splice cases described and claimed in British Pat. No. 1,431,167 (U.S. equivalent U.S. Pat. No. 4,142,592), the feed-through devices described and claimed in British Pat. No. 1,245,119 and the duct seal devices described and claimed in British Patent Application No. 45725/76 (U.S. equivalent U.S. Pat. No. 4,194,750).

One effective method of sealing a branch off at the end of a dimensionally-recoverable part is described in U.K. patent specification No. 2,019,120A (U.S. equivalent U.S. Pat. No. 4,298,415) in which a suitably shaped clip formed from a relatively rigid material is positioned over the end of the recoverable part between the substrates.

According to one aspect, the present invention provides a dimensionally-recoverable hollow body, preferably a dimensionally heat-recoverable hollow body, having a body wall provided with a plurality of locking elements that are engagable with each other, or are engagable with corresponding locking elements located on a separate partition, to furcate the body into a plurality of channels.

The locking elements are preferably in the form of protuberances and corresponding recesses. Thus at least one locking element of the body wall or located on the partition preferably has the form of a protuberance and at least one locking element that is engagable therewith has the form of a recess that can receive the protuberance. In this case it is advantageous to provide the locking elements before, during or after engagement, with means for retaining them together during recovery of the body, for example, depending on the shape of the locking elements, a rigid clip, cap, channel or other fastening device. In a preferred form of locking arrangement, the or each protuberance contains a rigid member which, together with the retaining means, prevents substantial deformation of the engaged locking elements during recovery of the body. This is important in the cases where the locking elements are formed from the same plastics material as the body wall because the material becomes elastomeric and therefore easily deformable at the recovery temperature of the body. The locking elements may be formed in the body wall by deformation thereof, in which case the engaged parts of the locking elements are advantageously gripped between the rigid member and the retaining means to prevent disengagement thereof during recovery. The locking elements may be elongate or not. Examples of locking elements which, with appropriate modification, may be used in the present invention are described in our copending U.K. application No. 8103625 filed on Feb. 5, 1981, the disclosure of which is incorporated herein by reference.

The body according to the invention has the advantage that it can be used to form an effective seal for a branch-off in the body, which is not liable to come apart during recovery of the body. One disadvantage that may be associated with the clips described in U.K. application No. 2,019,120A (U.S. equivalent U.S. Pat. No. 4,298,415), is that insertion of the clip pulls together opposite sides of the tube between the cables extending through the tube with the result that, when the tube is recovered, the opposite sides of the tube tend to be pulled away from each other as the tube tightens around the cables, and the clip slides off the end of the tube. This phenomenon is known in the art as "milking-off".

The locking elements of the hollow body may, in the broadest aspect of the invention, be engageable with each other without necessarily being engagable with elements on a separate partition or, alternatively, they may be engagable with corresponding elements on a separate partition without necessarily being engagable with each other. As an example of the latter case is one in which all the locking elements on the hollow body are in the form of recesses adapted to receive protuberances on the partition. This arrangement has the advantage that the locking elements can be arranged to receive the retaining means on the outer surface of the body. Preferably, however, the locking elements or at least some of the locking elements on the body are engagable with each other, and are also engagable with corresponding locking elements located on the partition. Thus it is advantageous for at least one locking element of the body wall to be in the form of a protuberance and at least one corresponding locking element in the body wall to be in the form of a recess. Such a body may be used to form a branch off with or without the aid of a separate partition as desired. For example, if no partition is used, the opposite sides of the body will be brought together and the channels so formed in the body will be of smaller cross-sectional area than if a separate partition is used. This arrangement therefore allows a single body to be used for enclosing different substrates where the branch lines differ substantially in diameter.

The body advantageously has three or more locking elements arranged so that it can be furcated into three or more channels. For example, a body having three locking elements may be employed in conjunction with a partition having a substantially "Y" shaped cross-section to form three channels. Also, if the body has three or more locking elements, and especially if it has four or more locking elements, it may be advantageous for at least one locking element (and, if four locking elements are provided, at least two elements) capable of being engaged with any two or more other locking elements. This form of body has the advantage that, because different pairs of locking elements may be engaged, the variety of branch lines of the substrates may be increased.

As stated above, the locking elements may be formed in the body wall by deformation thereof, for example by stamping the appropriate shape in the body wall or by vacuum forming techniques. By these methods it is possible to form locking elements that are dimensionally-recoverable, so that if any locking element is not engaged with a corresponding element, the portion of the body wall defining that locking element will recover to its undeformed configuration on recovery of the body. This it is possible to form bodies having more locking elements than will be needed in any single instance, and any locking element that is not used will disappear on recovery of the body.

The hollow body is preferably of a generally tubular configuration and in most cases will be open ended, for example where it is intended to be used as a splice case. In such a case it is preferable to provide locking elements in the body wall in the region of each end of the body in order to allow a branch-off at each end of the body to be sealed. The locking elements may be elongate in a direction parallel to the axis of the body or, alternatively, a plurality of locking elements may be located in the region of each other and parallel to the axis of the body if, as in most cases, it is desired for the channels so formed to have a significant length. Whilst it is not essential for the channels to have a significant length, because ingress of moisture may be prevented by the provision of a sealant of adhesive within the body, this may be preferred in certain instances, even where an adhesive is provided, in order to extend the length of path along which moisture would have to pass to enter the body, and also in order to accommodate more easily any mechanical strains caused by bending or flexing the enclosed object.

The hollow body may be formed as such or it may be formed by closing a wrap-around device about a substrate, and accordingly, the present invention also provides a wrap-around device which comprises a dimensionally-recoverable sheet having opposed edge portions that can be brought together and secured by means of a closure mechanism to form a dimensionally-recoverable hollow body, the sheet having a plurality of locking elements which, at least when the edge portions have been brought together, can be engaged with each other or with corresponding elements located on a separate partition, to furcate the hollow body into a plurality of channels.

Any polymeric material to which the property of dimensional recoverability may be imparted, may be used to form the body or the sheet of the wrap-around device. Preferably the body comprises a polymeric material to which the property of dimensional recoverability has been imparted by crosslinking and deforming the material. Polymers which may be used to form the polymeric material include polyolefins such as polyethylene and ethylene copolymers for example with propylene, butene, vinyl acetate or ethyl acrylate, polyamides, polyurethanes, polyvinyl chloride, polyvinylidene fluoride, elastomeric materials such as those described in U.K. Specification No. 1,010,064 (U.S. equivalent U.S. Pat. No. 3,597,372) and blends such as those disclosed in U.K. Specification No. 1,284,082 (U.S. equivalent U.S. Pat. No. 3,969,308) and No. 1,294,665, the disclosures of which are incorporated herein by reference. Preferably the cover is formed from a polyolefin or a blend of polyolefins, and especially it comprises polyethylene.

A polymeric composition may be cross-linked by any suitable means, for example by the incorporation of a chemical cross-linking agent or by exposure to high energy radiation. Examples of suitable crosslinking agents are free radical initiators such as peroxides for example, dicumyl peroxide, 2,5-bis-(t-butyl peroxy)-2,5-dimethylhexane, 2,5-bis(t-butyl-peroxy)-2,5-dimethylhexyne-3, α,α-bis(t-butylperoxy)-di-iso propyl-benzene. Other examples of appropriate cross-linking agents are disclosed in C. S. Sheppard & V. R. Kamath Polymer Engineering & Science 19 No. 9 597–606, 1979 "The Selection and use of Free Radical Initiators" the disclosure of which is incorporated herein by reference. In a typical chemically cross-linked composition there will be about 0.5 to 5 weight percent of peroxide based on the weight of the polymeric composition. The cross-linking agent may be employed alone or in association with a cocuring agent such as a poly-functional vinyl or allyl compound, e.g. triallyl cyanurate, triallyl isocyanurate or pentaerythritol tetra methacrylate.

Radiation cross-linking may be effected by exposure to high energy irradiation such as an electron beam or γ-rays. Radiation dosages in the range 2 to 80 Mrads, preferably 2 to 50 Mrads, e.g. 2 to 20 Mrads and particularly 4 to 15 Mrads are in general appropriate.

For the purpose of promoting cross-linking during irradiation preferably from 0.2 to 5 weight percent of a prorad such as a poly-functional vinyl or allyl compound, for example, triallyl cyanurate, triallyl isocyanurate or pentaerythritol tetramethacrylate are incorporated into the composition prior to irradiation.

The body advantageously has a coat of an adhesive or sealant over at least part and preferably substantially all its interior surface. A sealant is a material having a cohesive strength of the same order as its adhesive strength, which is used for filling voids and interstices to provide a seal against moisture, dust, solvents and other fluids. Sealant compositions are viscid, water resistant macromolecular compositions resembling newtonian fluids in exhibiting both viscous and elastic response to stress. They exhibit, in the sense of ASTM 1146, at least second order cohesive blocking (and preferably second order adhesive blocking to metals as well) at a temperature between room temperature and the crystalline melt or glass transition temperature or range of the composition. Known sealant compositions usually comprise mixtures of elastomers, or mixtures of thermoplastic polymers, or both, and include mastics, and hot melt sealants as described in Bullman, Adhesive Age, November 1976, pages 25–28. Preferably the body has a coat of a hot-melt adhesive. Examples of hot-melt adhesives that may be used, include those based on polyamides, vinyl and acrylic homo- and copolymers, such as ethylene-vinyl acetate and ethylene ethyl acrylate copolymers, polyesters and polyolefins. Preferred adhesives include polyamide adhesives as described in U.S. Pat. Nos. 4,018,733 to Lopez et al and 4,181,775 to Corke, the disclosures of which are incorporated herein by reference.

According to another aspect of the invention, there is provided a partition for furcating a hollow body, which comprises a wall portion having, at each of two opposed edges thereof, one or more locking elements arranged along each of the said edges, the locking elements being engagable with corresponding locking elements located on the body wall.

The partition may be formed with a simple, generally planar, wall portion for furcating the body into two channels (or into more than two channels if more than one partition is used) or it may be formed in a more complex configuration in which one or more additional wall portions extend outwardly from the central region of the wall portion, the or each additional wall portion having, at its free edge, one or more locking elements arranged along the free edge, so that the hollow body can be furcated into three or more channels. The locking elements preferably extend along substantially the entire length of the edges. They may be elongate or not although, if they are not elongate, preferably more than one locking element is located on each edge so that the partition can be joined to the wall portion along substantially the entire length of each edge.

The locking elements on the partition may all be in the form of protuberances or all in the form of recesses or both. In one preferred arrangement they are all in the form of protuberances so that retaining means can be positioned about the engaged locking elements on the external surface of the hollow body. In another preferred arrangement, however, at least one locking element on the partition is in the form of a protuberance and at least one other locking element is in the form of a recess so that the corresponding locking elements on the hollow body may either be engaged with the elements on the partition, or, if desired, be engaged with themselves without partition being present. This latter form of partition is especially useful if it has an even number of wall edges to be joined to the hollow body, in which case the number of elements in the form of protuberances is preferably equal to the number of elements in the form of recesses.

The body according to the invention, especially where it is used together with a partition or partitions, has the further advantage in that it is relatively easy to furcate into more than two channels because the different channels containing the branch lines of the substrate will be formed sequentially by engaging the appropriate locking elements. This means that the workman who installs the recoverable body may form a channel about one branch line by engaging locking elements in the body wall or engaging elements on the partition with those on the body wall, and then move on to the next channel without having to maintain the other branch lines and parts of the body in their correct spatial arrangement. In contrast, if the branch-off is formed by means of a multi-legged clip described in U.K. Specification No. 2019120A (U.S. equivalent U.S. Pat. No. 4,298,415), all the branch lines must be correctly positioned and the portions of the heat-shrinkable sleeve to be gripped must be brought together before the clip can be inserted. This can be very difficult where many branch lines are present or where they have large diameters.

The partition may be formed from a metal, or a polymeric material such as an engineering plastics material, a heat-recoverable composition or an elastomer. Advantageously at least part of the partition is elastic, thus allowing the partition to be stretched over the branch lines during installation. Another preferred form of partition is one which is at least partly dimensionally-recoverable, especially dimensionally heat-recoverable. Such a partition may be easily installed and will then recover to bring the branch lines together during recovery of the hollow body.

The partition is preferably provided with a reservoir of an adhesive or sealant, especially a hot-melt adhesive such as one of those described above. If the wall portion of the partition is formed from an elastomeric material, it is possible to arrange for it to be held in a distended configuration by the reservoirs of hot-melt adhesive, with the result that, when the body is heated to recover it, the adhesive will melt and the partition will recover its initial configuration. If the partition is intended to be used with bodies that recover other than by heat it is preferable for it to be provided with a reservoir of a mastic instead of a hot-melt adhesive so that the outlet can be sealed at ambient temperatures.

In the preferred partitions, the wall portions are provided with a mass of a conformable material for example a closed-cell foam or sponge or a conformable rubber such as a polyurethane rubber which materials will take up the contours of the substrate, in order to fill any interstices between the branch lines and the wall portions of the partition. The conformable material is preferably coated with an adhesive, for example a hot-melt or pressure-sensitive adhesive, in order to form a bond with the substrate.

It may, in many instances, be desirable for the partition wall to be electrically conductive and therefore to be used as an electric resistance heater in order to melt the hot-melt adhesive. The partition may be formed from a conductive polymer or may include a resistance heating element and be convertable by means of a plug and socket arrangement to an external electrical current source. In the case where the partition is dimensionally heat-recoverable, the electrical heating effect may also be used to recover the partition.

The invention also provides an arrangement comprising a dimensionally-recoverable hollow body or a wrap-around device as described above and a partition having a plurality of locking elements that are engagable with the locking elements of the hollow body or the wrap-around sheet to furcate the body into a plurality of channels.

The invention further provides a method of enclosing part of an elongate substrate that furcates into a plurality of branches, which comprises positioning a hollow body or wrap-around device as described above about the substrate, engaging the locking elements of the body with each other or with corresponding locking elements located on a separate partition to furcate the body into a plurality of channels each of which endorses one or more branches, and recovering the body about the substrate.

Several embodiments of the present invention will now be described by way of example with reference to the accompanying drawings in which:

FIGS. 4 and 5 show a wrap-around device according to the invention;

FIGS. 7 to 12 show another form of wrap-around device according to the invention; and FIGS. 13 and 14 show partitions according to the invention.

Figure 1:
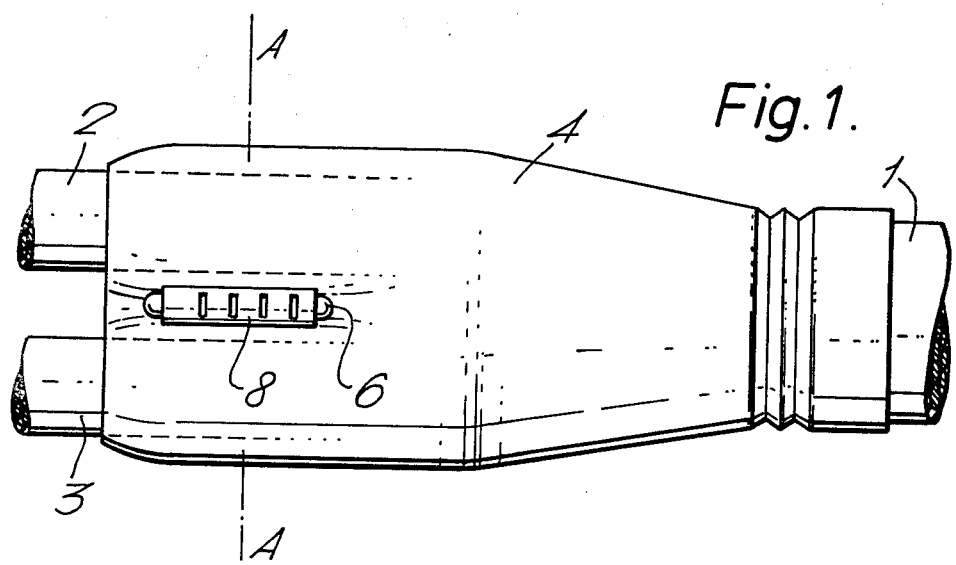
FIG. 1 shows one form of branch-off according to the invention installed about a cable.
Figure 2:
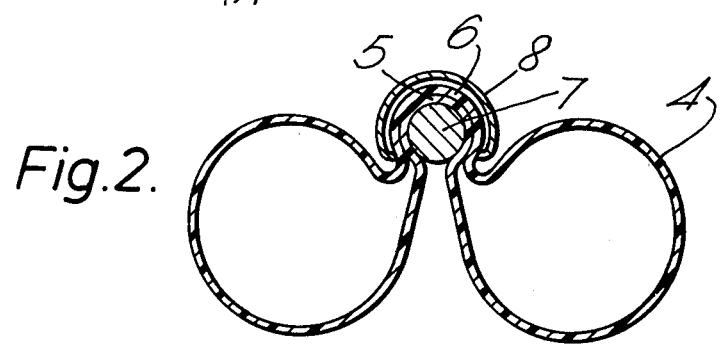
FIG. 2 is a section along a line A—A of FIG. 1.

Referring to the accompanying drawings, FIGS. 1 and 2 show a branch-off according to the invention that has been recovered about a splice in an electrical cable 1 in which the cable 1 is divided into two branch lines 2 and 3. The branch-off is in the form of an open ended tubular body 4 which has two elongate locking elements 5 and 6 in the body wall in the region of one end of the body. The locking element 5 has the form of a protuberance which is formed in the body wall by deformation of the wall and protrudes into the body from the inner surface of the body wall. Locking element 6 has also been formed by deformation of the body wall and has the form of a recess in the inner surface of the wall and a corresponding protuberance in the outer surface of the wall, the recess having such a size that it will receive the locking element 5 with a snug fit. The locking element 5 holds a rigid member 7 for example a short length of a metal rod or bar so that, when the locking elements 5 and 6 are engaged, a rigid channel 8 can be positioned over the externally protruding part of locking element 6 and the channel 8 and member 7 will together hold the locking elements in engagement.

The branch-off may be formed by extruding a tube of the appropriate diameter, crosslinking the polymeric material from which the tube is formed, cutting the tube to the appropriate length, expanding the length of the tube and forming the locking elements in the tube wall. The locking elements may be formed in the same operation as expansion by means of appropriately shaped mandrels. The inner surface of the tube may be provided with a coat of hot-melt adhesive at any convenient point of the manufacturing process. The rigid member may be inserted in the locking element 5 either during or subsequent to the formation of the locking element. The branch-off may be installed simply by positioning the body about the cable 1 so that the locking elements are disposed between the branch lines 2 and 3, pressing the locking elements into engagement, sliding the rigid channel 8 over the external profile of the locking element 6 and heating the body 4 until it recovers about the cable 1 and the hot-melt adhesive melts to form a seam against water ingress.

Figure 3:
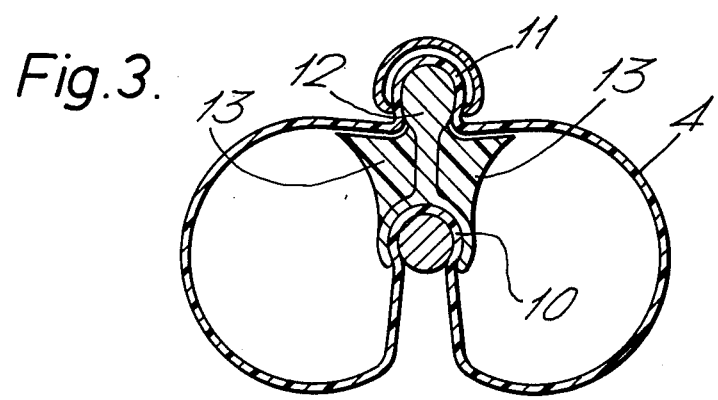
FIG. 3 is a section along a line A—A of FIG. 1 when the splice case of FIG. 1 is uesed with a partition.

FIG. 3 shows an arrangement similar to that shown in FIG. 1 but in which a partition has been placed inside the body and is joined to the body wall by engaging the locking elements 5 and 6 of the body 4 with corresponding elements 10 and 11 located on the partition. The partition has a central wall portion 12 which, as shown, is formed from a metal, preferably from steel, but which may instead be formed from an engineering plastics material, and, on each side of the wall portion 12, two reservoirs 13 of hot-melt adhesive. It can be seen by comparison of FIGS. 2 and 3 that the effective diameters of the channels formed by bifurcation of the body 4 may be increased significantly by the use of the partition.

FIGS. 4 and 5 show a wrap-around device which has a pair of corresponding locking elements 20, 21 and 22, 23 in the region of each end of the device, and a rail and channel closure mechanism as described in U.K. Pat. No. 1,155,470 (U.S. equivalent U.S. Pat. No. 3,455,336). The device may be wrapped around the substrate to be enclosed and, after either or both pairs of locking elements have been engaged as described above, it may be recovered about the substrate by heating. The locking elements 20, 21, 22 and 23 have been formed by deformation of the sleeve as described above, so that, if it is desired not to engage one pair of the locking elements, the unengaged elements will disappear upon recovery of the device as those portions of the wall containing the elements revert to their initial configuration.

Figure 6:
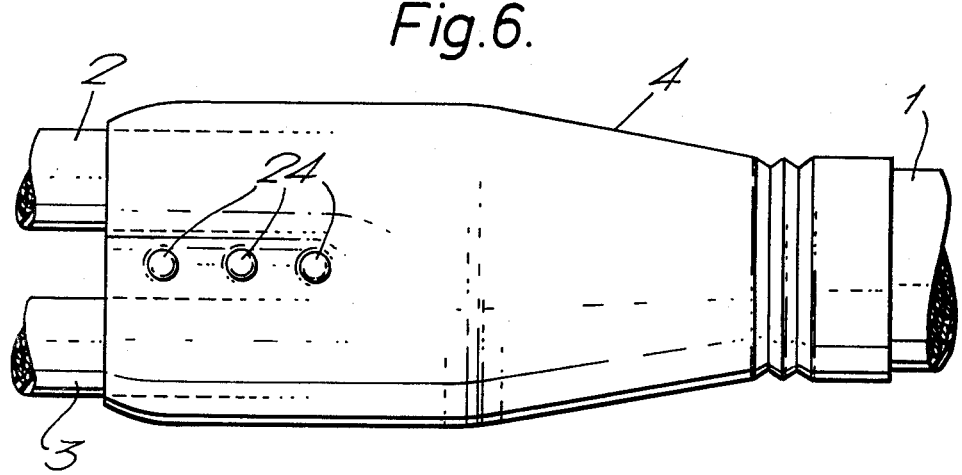
FIG. 6 shows a modification of the branch-off shown in FIG. 1.

FIG. 6 shows a similar device as that shown in FIGS. 1 and 2 with the exception that, instead of a single pair of elongate locking elements, the body has three pairs of corresponding locking elements of substantially circular form. The corresponding locking elements of each pair are in the form of protuberances and recesses, the protuberances holding a flat rigid member and the locking elements being provided, after engagement, with a retaining element in the form of a cap 24. The locking elements are preferably as described in FIG. 14 of U.K. patent application No. 8,103,625.

Figure 7:
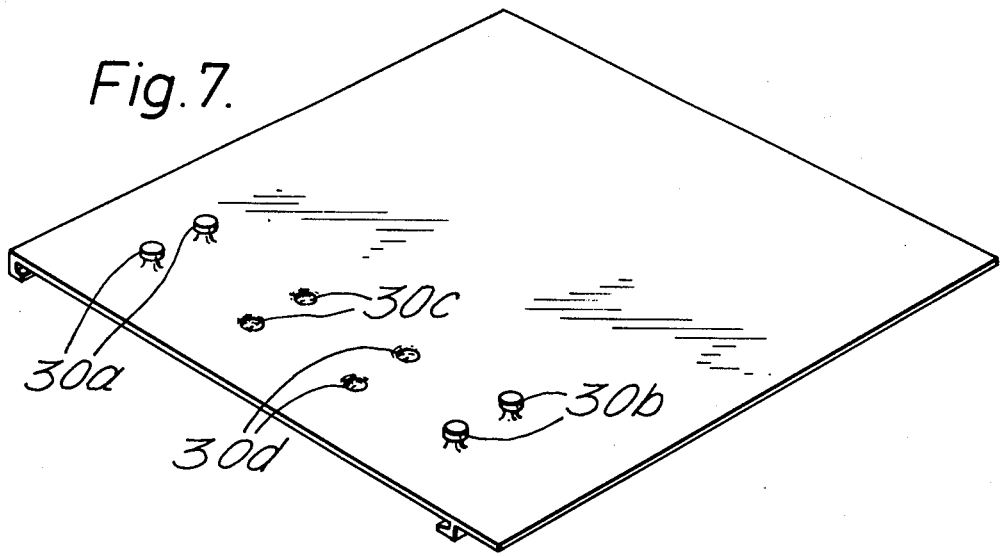
Figure 8:
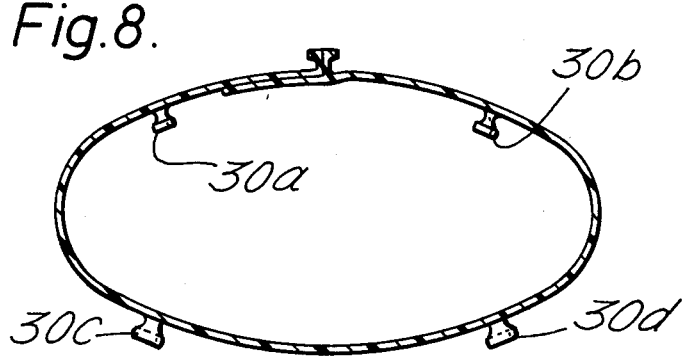

FIGS. 7 and 8 show a wrap-around device suitable for enclosing a cable splice have, at one end thereof, two pairs 30a and 30b of locking elements in the form of protuberances and two pairs 30c and 30d of corresponding locking elements in the form of recesses that are engagable with the locking elements 30a and 30b. The locking elements in each pair are arranged so that the pairs will lie in a line parallel to the axis of the body formed when the wrap-around is closed. The side of the wrap-around device that will form the interior surface is coated with a layer of hot-melt adhesive in order to provide a seal against moisture ingress after installation of the device. Each pair of locking elements 30a and 30b in the form of protuberances is engagable with either pair of locking elements 30c and 30d in the form of receses in order to allow the number and/or size of the channels formed by engagement of the elements to be varied as shown schematically in FIGS. 9 to 11. FIG. 9 shows the arrangement of channels formed by engagement of elements 30a with elements 30d and elements 3b with elements 30d, while FIG. 11 shows the arrangement formed by engagement of elements 30c with elements 30d alone, and FIG. 12 shows the arrangement formed by engagement of elements 30b with elements 30d alone. The unengaged elements in the arrangement shown in FIGS. 10 and 11 will disappear when the device is heated to cause recovery about the cable.

The wrap-around device may be advantageously modified by providing further locking elements at the other end of the sheet to allow furcation of both ends of the hollow body formed when the wrap-around deivce is closed. Preferably the further locking elements are of the same form, and have the same spatial arrangement as the locking elements 30.

The locking elements may, instead of being engaged with each other, be engaged with corresponding elements on a separate partition for example as shown schematically in FIG. 12 in which a partition 32 divides the hollow body 33 formed by the wrap-around device into four channels.

FIG. 13 shows a partition according to the invention for dividing a hollow body into three channels. The partition comprises a wall having three arms 34 which are formed from a metal or an engineering plastics material and which have, at their free edges, a protuberance 35 for engaging recesses in the body wall of the hollow body. A thick reservoir of a hot-melt adhesive 36 is provided on each side of the arms 34 so that, when the partition has been installed and the body is recovered by heating, heat will be conducted through the arms 34 and melt the hot-melt adhesive 36 to seal the branch-off against moisture ingress.

FIG. 14 shows another form of partition according to the invention which may be used to divide a hollow body into four channels, for example as shown in FIG. 12. The partition comprises a wall having four arms 37 formed from a metal, engineering plastics or a heat-recoverable polymer, each of which has a locking element at its free end. Two locking elements 38 are in the form of protuberances and two other locking elements 39 are in the form of recesses. Each side of the arms 37 is provided with a conformable mass 39 preferably formed from a resilient elastomer, or a foam, which will take up the contours of the branch lines on recovery of the body. The surface of each mass 39 is coated with a layer 40 of hot-melt adhesive if the partition is intended for used with a heat-recoverable body, or a layer of a mastic if it is intended for use with a "cold-shrink" body.

We claim:

1. A dimensionally-recoverable sleeve or wrap-around sleeve having a wall provided with a plurality of locking elements located on the wall that are engagable with each other, or are engagable with corresponding locking elements located on a separate partition, to furcate the sleeve or wrap-around sleeve into a plurality of channels.

2. A sleeve or wrap-around sleeve as claimed in claim 1, wherein at least one locking element located on the wall or on the partition has the form of a protuberance and at least one locking element that is engagable therewith has the form of a recess that can receive the protuberance.

3. A sleeve or wrap-around sleeve as claimed in claim 2, wherein the wall has at least one locking element in the form of a protuberance and at least one corresponding locking element in the form of a recess.

4. A sleeve or wrap-around sleeve as claimed in claim 1, wherein the locking elements are provided with means for retaining them together during recovery of the sleeve or wrap-around sleeve.

5. A sleeve or wrap-around sleeve as claimed in claim 4, wherein the or each protuberance contains a rigid member which, together with the retaining means, prevents substantial deformation of the engaged elements during recovery of the sleeve or wrap-around sleeve.

6. A sleeve or wrap-around sleeve as claimed in claim 1, wherein at least one locking element on the wall has been formed by deformation of the wall and is dimensionally-recoverable so that, if it is not engaged with a corresponding locking element, that portion of the wall will recover to its undeformed configuration on recovery of the sleeve or wrap-around sleeve.

7. A sleeve or wrap-around sleeve as claimed in claim 1 that has three or more locking elements arranged to allow the sleeve or wrap-around sleeve to be furcated into three or more channels.

8. A sleeve or wrap-around sleeve as claimed in claim 1, having a plurality of locking elements that are engagable with each other, the locking elements also being engagable with corresponding locking elements located on a separate partition.

9. A sleeve or wrap-around sleeve as claimed in claim 1, having a plurality of locking elements that are engagable with each other, the locking elements also being engagable with corresponding locking elements located on a separate partition.

10. A sleeve or wrap-around sleeve as claimed in claim 1, which is of a generally tubular configuration.

11. A sleeve or wrap-around sleeve as claimed in claim 10, which has two open end portions and the wall has a plurality of locking elements to allow it to be furcated in the region of each end portion.

12. A sleeve or wrap-around sleeve as claimed in claim 11, wherein the locking elements are elongate in a direction parallel to the axis of the sleeve or wrap-around sleeve.

13. A sleeve or wrap-around sleeve as claimed in claim 10, wherein a plurality of locking elements are located in the region of each other and parallel to the axis of the sleeve or wrap-around sleeve.

14. A sleeve or wrap-around sleeve as claimed in claim 1, which is dimensionally heat-recoverable.

15. A sleeve or wrap-around sleeve as claimed in claim 1, which is formed from a cross-linked polymeric material.

16. A sleeve or wrap-around sleeve as claimed in claim 15, wherein the polymeric material has been cross-linked by irradiation.

17. A sleeve or wrap-around sleeve as claimed in claim 16, wherein the polymeric material has been cross-linked by electron irradiation.

18. A sleeve or wrap-around sleeve as claimed in claim 1, which is a wrap-around sleeve.

19. A sleeve or wrap-around sleeve as claimed in claim 1, which has a coat or an adhesive or sealant over at least part of its interior surface.

20. A sleeve or wrap-around sleeve as claimed in claim 19, which has a coat of a hot-melt adhesive over at least part of its interior surface.

21. An arrangement which comprises a sleeve or wrap-around sleeve as claimed in claim 1, and a partition having a plurality of locking elements that are engagable with the locking elements of the sleeve or wrap-around sleeve to furcate the sleeve or wrap-around sleeve into a plurality of channels.

22. A furcated elongate substrate enclosed by a sleeve or wrap-around sleeve as claimed in claim 1.

23. A substrate as claimed in claim 22 which is an electrical cable.

24. A wrap-around sleeve which comprises a dimensionally-recoverable sheet having opposed edge portions that can be brought together and secured by means of a closure mechanism to form a dimensionally-recoverable hollow body, the sheet having a plurality of locking elements which at least when the edge portions have been brought together, can be engaged with each other or with corresponding elements located on a separate partition, to furcate the hollow body into a plurality of channels.

25. An arrangement which comprises a wrap-around sleeve as claimed in claim 24, and a partition having a plurality of locking elements that are engagable with the locking elements of the sheet to furcate the hollow body into a plurality of channels.

26. A furcated elongate substrate enclosed by a wrap-around sleeve as claimed in claim 24.

27. A substrate as claimed in claim 26 which is an electrical cable.

28. A partition for furcating a hollow body, which comprises a wall portion having, at each of two opposed edges thereof, one or more locking elements arranged along each of the said edges, the locking elements being engagable with corresponding locking elements located on the body wall.

29. A partition as claimed in claim 28, wherein one or more additional wall portions extend outwardly from the central region of the wall portion, the or each additional wall portion having, at its free edge, one or more locking elements arranged along the free edge, so that a hollow body can be furcated into three or more channels.

30. A partition as claimed in claim 28, wherein the locking elements are in the form of protuberances that are engagable with locking elements in the form of recesses in the body wall.

31. A partition as claimed in claim 28, at least part of which is elastic.

32. A partition as claimed in claim 28, at least part of which is dimensionally recoverable.

33. A partition as claimed in claim 32, at least part of which is dimensionally heat-recoverable.

34. A partition as claimed in claim 28, which is provided with a reservoir of an adhesive or sealant.

35. A method of enclosing part of an elongate substrate that furcates into a plurality of branches, which comprises positioning about the substrate a dimensionally-recoverable sleeve or wrap-around sleeve having a wall provided with a plurality of locking elements located on the wall that are engagable with each other or are engagable with corresponding locking elements located on a separate partition, engaging the locking elements on the wall with each other or with corresponding locking elements located on the partition to furcate the sleeve or wrap-around sleeve into a plurality of channels so that each channel encloses a branch of the substrate, and recovering the sleeve or wrap-around sleeve about the substrate.

36. A method of enclosing part of an elongate substrate that furcates into a plurality of branches, which comprises positioning about the substrate a wrap-around sleeve which comprises a dimensionally-recoverable sheet having opposed edge portions that can be brought together and secured by means of a closure mechanism to form a dimensionally-recoverable hollow body, the sheet having a plurality of locking elements which at least when the edge portions have been brought together, can be engaged with each other or with corresponding elements located on a separate partition, engaging the locking elements of the body with each other or with the corresponding locking elements located on a separate partition to furcate the body into a plurality of channels so that each channel encloses a branch of the substrate, and recovering the body about the substrate.

* * * * *

UNITED STATES PATENT AND TRADEMARK OFFICE
CERTIFICATE OF CORRECTION

PATENT NO. : 4,458,104

DATED : July 3, 1984

INVENTOR(S) : Penneck et al.

It is certified that error appears in the above-identified patent and that said Letters Patent are hereby corrected as shown below:

In column 4, line 32, the word "of", second occurrence should read --or--.

Signed and Sealed this

Twentieth Day of May 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,458,104
DATED : July 3, 1984
INVENTOR(S) : Penneck et al

It is certified that error appears in the above-identified patent and that said Letters Patent are hereby corrected as shown below:

In claim 6, line 2, after the word "element" the word --located-- should be inserted.

Signed and Sealed this

Seventeenth Day of June 1986

[SEAL]

Attest:

DONALD J. QUIGG

Attesting Officer

Commissioner of Patents and Trademarks